United States Patent
Overbeek et al.

(10) Patent No.: US 6,759,472 B2
(45) Date of Patent: Jul. 6, 2004

(54) AQUEOUS ALKYD AND VINYL POLYMER DISPERSIONS

(75) Inventors: Gerardus Cornelis Overbeek, Waalwijk (NL); Jurgen Scheerder, Waalwijk (NL); Pablo Steenwinkel, Waalwijk (NL); Ronald Tennebroek, Waalwijk (NL)

(73) Assignee: Avecia BV, Waalwijk (NL)

( * ) Notice: Subject to any disclaimer, the term of this patent is extended or adjusted under 35 U.S.C. 154(b) by 0 days.

(21) Appl. No.: 10/363,034

(22) PCT Filed: Oct. 1, 2001

(86) PCT No.: PCT/GB01/04364
§ 371 (c)(1),
(2), (4) Date: Feb. 28, 2003

(87) PCT Pub. No.: WO02/28977
PCT Pub. Date: Apr. 11, 2002

(65) Prior Publication Data
US 2003/0195285 A1 Oct. 16, 2003

(30) Foreign Application Priority Data
Oct. 6, 2000 (GB) .............................................. 0024504

(51) Int. Cl.$^7$ .............................. C08J 3/00; C08K 3/20; C08L 75/00; C08L 33/00; B05D 3/02

(52) U.S. Cl. ................. 524/500; 427/372.2; 427/385.5; 524/502; 524/507; 524/515; 524/522; 524/523

(58) Field of Search ................................. 524/500, 502, 524/507, 515, 522, 523; 427/372.2, 385.5

(56) References Cited

U.S. PATENT DOCUMENTS

| | | | |
|---|---|---|---|
| 4,116,903 A | 9/1978 | Lietz et al. | 260/22 CB |
| 4,413,073 A | * 11/1983 | Gibson et al. | |
| 4,451,596 A | 5/1984 | Wilk et al. | 523/501 |

FOREIGN PATENT DOCUMENTS

| | | |
|---|---|---|
| DE | 196 29 941 A1 | 1/1998 |
| GB | 1102683 | 2/1968 |
| WO | 99/07759 | 2/1999 |

* cited by examiner

*Primary Examiner*—Patrick D. Niland
(74) *Attorney, Agent, or Firm*—Morgan, Lewis & Bockius LLP

(57) ABSTRACT

An aqueous dispersion comprising an alkyd, vinyl polymer I, vinyl polymer II and a liquid medium where vinyl polymer I is preformed prior to incorporation into the aqueous dispersion and where vinyl polymer II is prepared in the presence of the alkyd and the vinyl polymer I.

17 Claims, No Drawings

AQUEOUS ALKYD AND VINYL POLYMER DISPERSIONS

The present invention relates to aqueous polymer dispersions comprising alkyds and vinyl polymers, a process for making such dispersions and the use of such dispersions for coatings.

The term alkyd is used to describe unsaturated fatty acid residue containing esters which are prepared from the reaction of a polyhydric alcohol, a polybasic acid and a drying oil. The unsaturation in the ester polyol imparts latent crosslinkability so that when a coating composition thereof is dried in the air, often in conjunction with a drier salt, the coating material undergoes crosslinking (autoxidation) and thereby improving its properties, for example its chemical resistance, hardness and durability. Alkyds however, due to the unsaturated fatty acid residues may be water-insoluble and therefore not easy to disperse in water, and furthermore alkyds are known to have a slow physical drying time. Vinyl polymers, on the other hand, are not known to suffer from such drawbacks.

Vinyl polymer dispersions are commonly used as aqueous polymer dispersions for coatings, however coatings derived from vinyl polymer dispersions tend to have poor gloss, poor filling and insufficient wood wetting and often require coalescing solvents to aid film formation. Alkyds, however, are known not to have such disadvantages.

Thus, it could be expected that a mixture of an alkyd dispersion and a vinyl polymer dispersion would improve the negative effects mentioned above of both the alkyd and the vinyl polymer on resultant coatings. Tijs Nabuurs and Anton German, Progress in Organic Coatings, Vol: 27, pages 163–172 (1996) discuss that a mixture of alkyd and vinyl polymers can exist as a blend of a vinyl polymer dispersion and an alkyd dispersion, however although the dispersions are blended, the alkyd and vinyl polymers still exist in distinct particles or phases. U.S. Pat. No. 3,919,145 and 4,108,811 describe water based compositions prepared by blending an oxidatively curable oil or an alkyd modified polyurethane with an acrylic or vinyl acetate latex.

A more effective way to form an intimate dispersion could be expected to be by forming the vinyl polymer in-situ, i.e. where all of the vinyl monomers are polymerised in the presence of the alkyd dispersion. U.S. Pat. No. 4,413,073 discloses the preparation of a film forming polymer from a dispersion comprising individual particles of preformed polymer and monomers where the monomers are polymerised in the presence of an amphiphatic compound. S.Wang et al, Journal of Applied Polymer Science, Vol 60, pages 2069–2076 (1996) discuss the emulsion and miniemulsion copolymerisation of acrylic monomers in the presence of an alkyd.

It has been found, however that a disadvantage with such an approach is that unsaturation (due to the unsaturated fatty acid residues) in an alkyd tends to impair conversion of vinyl monomer to vinyl polymer and this effect becomes more pronounced as the level of unsaturation in the alkyd increases. A possible explanation given for the reduction of vinyl monomer conversion is that the unsaturated sites on the alkyd capture free radicals and therefore slow down the vinyl polymerisation which of course proceeds by a free radical initiated mechanism. Furthermore, the unsaturated site on the alkyd is partially or even entirely lost, resulting in the partial or total loss of the autoxidation properties of the alkyd.

We have discovered stable aqueous dispersions of alkyds and vinyl polymers, which overcome the problems discussed above.

Thus, according to a first embodiment of the present invention there is provided an aqueous dispersion comprising:

(i) alkyd;
(ii) vinyl polymer I
(iii) vinyl polymer II; and
(iv) liquid medium wherein said vinyl polymer I is pre-formed prior to incorporation into the aqueous dispersion and wherein said vinyl polymer II is prepared in the presence of the alkyd and vinyl polymer I.

Preferably the vinyl polymer I and the alkyd are each pre-formed prior to incorporation into the aqueous dispersion. Surprisingly, in spite of the alkyd and vinyl polymer I being preformed, and therefore apparently consisting of a mixture of distinct particles or phases, the improvements resulting from such polymer types is not impaired.

According to a second embodiment of the present invention there is also provided a process for preparing an aqueous dispersion according to the present invention comprising combining:

(a) alkyd;
(b) olefinically unsaturated monomer(s);
(c) vinyl polymer I; and
(d) liquid medium;

at a temperature in the range of from 0 to 85° C., followed by polymerisation of the olefinically unsaturated monomer(s) to form a vinyl polymer II.

For the purposes of this invention an "aqueous dispersion" means a dispersion of the alkyd and vinyl polymers I and II in a liquid medium comprising at least 50% by weight, more usually at least 80% by weight of water. Minor amounts of organic liquid(s) may be present if desired or required. Furthermore the term "dispersion" is intended to additionally embrace emulsions, suspensions or solutions, the exact nature of the dispersion depending on the components used.

We have found that the aqueous dispersion of the invention does not suffer from impaired autoxidation properties of the alkyd and a higher solids level is attainable in the aqueous polymer dispersion as compared to the corresponding blends. Furthermore low or no volatile organic compounds are required to aid dispersion of the alkyd, as the dispersion of the alkyd in water is enabled not only by the nature of the alkyd but also by the presence of the olefinically unsaturated monomer(s) which are used as a reactive diluent and reduce the viscosity of the alkyd without contributing to the levels of volatile organic compounds (due to the subsequent polymerisation thereof to a polymer), and thus any requirement for additional solvent may be minimised.

Not wishing to be bound by a theory, it is believed that the alkyd may act as a non-volatile coalescing agent and that the majority of the olefinically unsaturated monomer(s) used to make vinyl polymer II diffuse from dispersed alkyd particles, through the water phase into the pre-formed dispersed vinyl polymer I particles (due to the better compatibility of the olefinically unsaturated monomer(s) with the vinyl polymer I than with the alkyd) where they swell the dispersed vinyl polymer I particles. Any free radical polymerisation of the olefinically unsaturated monomer(s) then does not result in the loss of the unsaturation in the alkyd since the free radical polymerisation predominantly occurs in the vinyl polymer I particles.

The alkyd may be any known in the art and for the purposes of this specification the term alkyd includes derivatives thereof such as uralkyds. General processes for preparing alkyds are disclosed in U.S. Pat. No. 4,108,811 and in "Alkyd Resin Technology", T C Patton, 1962, Publisher John Wiley & Sons Inc.

Alkyd polyols are preferably prepared by the direct reaction of a triglyceride oil with for example a N,N-dialkanolamine, usually in the presence of a strong base such as sodium methoxide. Suitable triglyceride oils include but are not limited to soyabean oil, palm oil, linseed oil, tung oil, rapeseed oil, sunflower oil, dehydrated caster oil, tall oil and safflower oil.

Uralkyds may be prepared by reacting alkyds having isocyanate-reactive groups with polyisocyanates and optionally other components having isocyanate-reactive groups. Isocyanate-reactive groups are defined as groups which will react with an isocyanate group (—NCO) and examples include —OH, —NH$_2$, —NH—, and —SH. Preferred isocyanate-reactive groups are —OH. Other components include but are not limited to polyamines and polyols, for example polyols having water-dispersing groups, as described below.

Examples of suitable polyisocyanate(s), (normally diisocyanate(s)) include aliphatic and cycloaliphatic polyisocyanates such as ethylene diisocyanate, 1,6-hexamethylene diisocyanate HDI, isophorone diisocyanate (IPDI), cyclohexane-1,4-diisocyanate, 4,4'-dicyclohexylmethane dissocyanate, cyclopentylene diisocyanate, p-tetra-methylxylene diisocyanate (p-TMXDI) and its meta isomer (m-TMXDI), hydrogenated 2,4-toluene diisocyanate and hydrogenated 2,6-toluene diisocyanate. Also araliphatic and aromatic polyisocyanates may be used, such as p-xylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate and 1,5-naphthylene diisocyanate. Particularly preferred is 2,4-toluene diisocyanate (TDI), optionally in admixture with its 2,6-isomer.

Mixtures of polyisocyanates can be used and also polyisocyanates which have been modified by the introduction of urethane, allophanate, urea, biuret, carbodiimide, uretonimine or isocyanurate residues.

Water-dispersability of alkyds may be achieved by building water-dispersing groups into the alkyd. Suitable water-dispersing groups include ionic groups such as anionic carboxylic acid groups and/or non-ionic water-dispersing groups such as polyethylene oxide (PEO) chain groups. Preferably the alkyd contains water-dispersing groups.

A suitable polyol(s) having carboxylic acid groups is preferably a low molecular weight (<500 Daltons) polyol, in particular a diol, whereby carboxylate anionic groups may be provided by the carboxylic acid groups after neutralisation with a suitable base. Particularly preferred are dihydroxyalkanoic acids of Formula 1:

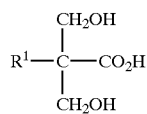

Formula 1 wherein R$^1$ is hydrogen or alkyl (usually C$_1$ to C$_5$ alkyl). By far the most preferred polyol having carboxylic acid groups is 2,2-dimethylol propionic acid (DMPA).

The conversion of the acid groups present in the alkyd resin to anionic salt groups may be effected (where necessary) by neutralising the acid groups with a suitable base such as ammonia, triethylamine, ethanolamine, dimethylethanolamine or an inorganic base such as LiOH, NaOH or KOH.

Use of a PEO chain containing compound(s) in the preparation of the alkyd provides pendant and/or terminal polyethylene oxide chains in the resulting alkyd and allows the preparation of alkyds with much lower acid values which can nevertheless still be effectively dispersed in water to provide an aqueous dispersion of the alkyd. Reduced acid values allow reduced viscosity of the dispersions thus making them easier to apply as a component of a coating composition, as well as improving the water resistance of the dried alkyd-containing coating.

A small segment of a PEO chain may be replaced by polypropyleneoxide or butyleneoxide but should still contain PEO as a major part of the chain (preferably at least 50% of any PEO chain should be PEO groups).

Pendant PEO chains may be introduced by employing a poly (preferably di) functional isocyanate-reactive compound having a pendant PEO group(s) in the alkyd synthesis. Terminal PEO chains may be introduced by employing a monofunctional compound having a PEO chain in the alkyd synthesis.

Optionally, the alkyd may contain additional polyol(s). Preferably low molecular weight polyol(s) are used. Examples of such lower molecular weight polyols include ethylene glycol, diethylene glycol, tetraethylene glycol, bis (hydroxyethyl) terephthalate, 1,4-cyclohexane dimethanol, furan dimethanol, glycerol and the reaction products, up to molecular weight 499, of such polyols with propylene and/or ethylene oxide.

The use of polyols which are not diol(s), e.g. with a functionality greater than 2, can cause large increases in viscosity of the alkyd, and therefore the amount of such additional polyol(s) should preferably not be in excess of 10% by weight.

The reaction to form an alkyd may be carried out in a single step, i.e. all the reactants being present at the beginning of the reaction, or two or more steps may be employed, with one or more reactants being added at different stages of the reaction after its commencement.

Options for forming a uralkyd include preparing an isocyanate-terminated prepolymer which is chain extended with an active hydrogen containing compound. If the uralkyd is made in such a manner the unsaturated fatty acid residue bearing compound may be introduced during the prepolymer formation and/or during the chain extension step. Alternatively a uralkyd may be made by capping an isocyanate-terminated uralkyd with monofunctional isocyanate-reactive compounds or by using an excess of fatty acid residue bearing compounds having isocyanate-reactive compounds during the uralkyd preparation. Catalysts may be used to assist uralkyd formation and include for example organotin catalysts such as dibutyltin dilaurate.

Suitable examples of chain extenders known in the art, which may be reacted with an isocyanate terminated prepolymer include polyol(s), amino-alcohol(s), primary or secondary polyamine(s), [especially diamine(s)] and hydrazine(s) or substituted hydrazine(s). Water itself may be effective as an indirect chain extender.

An organic solvent may optionally be added before, during or after alkyd formation to control viscosity. Suitable organic solvents which may be used include acetone, methylethylketone, dimethylformamide, diglyme, N-methylpyrrolidone, dimethylacetamide, ethyl acetate, ethylene and propylene glycol diacetates, alkyl ethers of ethylene and propylene glycol acetates, toluene, oxylene and sterically hindered alcohols such as t-butanol and diacetone alcohol. The preferred solvents are water-miscible solvents such as N-methylpyrrolidone and methyl ethyl ketone. Preferably less than 25%, more preferably less than 15%, most preferably less than 5% and especially 0% by weight of organic solvent based on the weight of alkyd is used.

An aqueous alkyd dispersion is preferably prepared by dispersing the alkyd with some or all of the olefinically unsaturated monomer(s) (optionally carried in an organic solvent medium) to be subsequently polymerised to give vinyl polymer II, in an aqueous medium, preferably utilising the self-dispersability properties of the alkyd arising from any anionic, cationic or non-ionic water dispersing groups present in the alkyd. Preferably some or all of the olefinically unsaturated monomers are added to the alkyd before the alkyd is dispersed.

An alkyd may be dispersed in water using techniques well known in the art. Preferably the alkyd is added to the water with agitation, alternatively water may be stirred into the alkyd. Optionally a surfactant or a mixture of surfactants may be added to facilitate the dispersion of the alkyd. The surfactant(s) may be anionic, cationic, non-ionic or a mixture thereof.

By a vinyl polymer I herein is meant a homo or copolymer derived from the addition polymerisation (using a free radical initiated process and usually in an aqueous medium) of one or more olefinically unsaturated monomer(s), which are also referred to as vinyl monomers. Particularly preferred vinyl polymer(s) I are styrene and/or acrylic polymers (i.e. based predominantly on styrene and/or at least one ester of acrylic or methacrylic acid)

Examples of olefinically unsaturated monomer(s) which may be used to form the is vinyl polymer I include but are not limited to 1,3-butadiene, isoprene, styrene, α-methyl styrene, divinyl benzene, indene, acrylonitrile, methacrylonitrile, vinyl halides such as vinyl chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

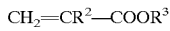

wherein $R^2$ is H or methyl and $R^3$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, trifluorethyl(meth)acrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as 2-hydroxyethyl acrylate, 2-hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation). Olefinically unsaturated monocarboxylic and/or dicarboxylic acids, such as acrylic acid, methacrylic acid, fumaric acid, and itaconic acid are other examples that can be used.

Particularly preferred are vinyl polymer(s) I made from olefinically unsaturated monomer(s) comprising at least 20 weight % of one or more monomers of the formula $CH_2=CR^2COOR^3$ defined above. Such preferred polymers are defined herein as acrylic polymers. More preferably at least 30 weight % of such monomers, and particularly at least 40 weight % are used. The other monomers in such acrylic polymers (if used) may include one or more of the other olefinically unsaturated monomers mentioned above, and/or may include ones different to such other monomers. Styrene is a useful other monomer. Preferred (meth)acrylic ester monomers include methyl methacrylate, n-butyl acrylate, n-butyl methacrylate, and 2-ethylhexyl acrylate.

In a preferred embodiment the vinyl polymer I comprises 1 to 20% by weight of acetoacetoxy ethyl methacrylate (AAEM), more preferably 2 to 10% by weight of MEM. In a particularly preferred embodiment the vinyl polymer I comprises 10 to 40% by weight of acrylonitrile; 30 to 60% by weight of styrene; 2 to 8% by weight of acid functional olefinically unsaturated monomers; and 0 to 50% by weight of other olefinically unsaturated monomers; wherein the sum of the percentages add up to 100%.

The vinyl polymer I may optionally contain wet-adhesion promoting functional groups such as acetoacetoxy groups and optionally substituted amine or urea groups, for example cyclic ureido groups, imidazole groups, pyridine groups, hydrazine to semicarbazide groups.

The vinyl polymer I can be formed by any methods known in the art, including but not limited to methods such as batch, semi-batch, sequential, gradient, seeded, emulsion, and oligomer stabilised polymerisation methods. The vinyl polymer I may also be optionally crosslinkable by means known to those in the art, for example by Schiff base crosslinking, or metal ion cross-linking. The vinyl polymer I of the invention dispersion is normally made by an aqueous free-radical polymerisation process.

All of the olefinically unsaturated monomer(s) to be polymerised may be present at the commencement of the vinyl polymerisation, or some or all of the monomer(s) may be added to the reaction medium during the course of the polymerisation (in one or more stages or continuously).

The polymerisation of the olefinically unsaturated monomer(s) to form the vinyl polymer I will require the use of a free-radical-yielding initiator(s) to initiate the vinyl polymerisation. Suitable free-radical-yielding initiators include inorganic peroxides such as K, Na or ammonium persulphate, hydrogen peroxide, or percarbonates; organic peroxides, such as acyl peroxides including benzoyl peroxide and alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite and iso-ascorbic acid. Azo compounds such as azobisisobutyronitrile may also be used. Metal compounds such as Fe.EDTA (EDTA is ethylene diamine tetracetic acid) may also be usefully employed as part of the redox initiator system. Particularly preferred is the use of an initiator system partitioning between the aqueous and organic phases, e.g. a combination of t-butyl hydroperoxide, iso-ascorbic acid and Fe-EDTA. The amount of initiator or initiator system to use is conventional, for example within the range of 0.05 to 6 wt. % based on the weight of the olefinically unsaturated monomer(s) used.

An aqueous vinyl polymerisation normally would need to be performed in the presence of an external stabilising and/or dispersing material, and when making an aqueous dispersion of a vinyl polymer, a conventional emulsifying agent would need to be employed (for example anionic and/or non-ionic emulsifiers such as Na salts of dialkylsulphosuccinates, Na salts of sulphated oils, Na salts of alkyl sulphonic acid, Na, K and ammonium alkyl sulphates, $C_{22-24}$ fatty alcohols, ethyoxylated fatty acids and/or fatty amides, and Na salts of fatty acids such as Na stearate and Na oleate), the amount used is usually 0.1 to 5% by weight based on the total olefinically unsaturated monomer(s) used.

The theoretical glass transition temperature, calculated using the Fox equation, of the vinyl polymer I may vary within a wide range, a possible range being from −50 to 120° C., preferably from −20 to 80° C.

It is understood that it may in some cases be possible to incorporate more than one pre-formed vinyl polymer I in the dispersion of the invention (e.g. two or more, produced for example using a sequential polymerisation process) and the term "vinyl polymer I" is intended to embrace two or more vinyl polymers as well as just one vinyl polymer.

Vinyl polymer II is prepared in-situ, i.e. in the presence of the alkyd and vinyl polymer I, and vinyl polymer II is obtainable from the polymerisation of one or more olefinically unsaturated monomer(s) as described above for vinyl polymer I. Preferred monomers include but are not limited to methyl (meth)acrylate, ethyl (meth)acrylate, butyl (meth) acrylate, styrene and/or combinations thereof.

If the alkyd is carboxylic acid stabilised and neutralised, then preferably acidic olefinically unsaturated monomer(s) such as acrylic acid, methacrylic acid, fumaric acid, maleic acid, crotonic acid, itaconic acid and β-carboxyethyl acrylate are excluded from vinyl polymer II.

The liquid medium preferably comprises the liquid medium used to prepare the alkyd dispersion and the vinyl polymer I dispersion. The liquid medium may comprise water and water miscible organic solvents as described above. Preferably the liquid medium comprises 50 to 100% by weight of water, more preferably 80 to 100% by weight of water, most preferably 90 to 100% by weight of water and especially 95 to 100% by weight of water.

Part or all of the olefinically unsaturated monomer(s) used to prepare vinyl polymer II may be added to the alkyd during the alkyd preparation or added to the alkyd dispersion or added to the alkyd dispersed in the vinyl polymer I dispersion. The order of combining alkyd, olefinically unsaturated monomer(s) and vinyl polymer I is not important, preferably though, the alkyd containing optionally some or all of the olefinically unsaturated monomers and optionally some water is dispersed into a dispersion of the vinyl polymer I under agitation at temperatures between 0 and 85° C. If the alkyd is an uralkyd prepared by chain extension, chain extension may be carried out before or after combination with the olefinically unsaturated monomer(s) and vinyl polymer I but any chain extension should be carried out before polymerisation of the olefinically unsaturated monomer(s).

The amount of olefinically unsaturated monomer(s) used to prepare vinyl polymer II in the aqueous dispersion is preferably from 1 to 50% w/w, more preferably from 2 to 40% w/w most preferably 3 to 30% w/w based on the weight of alkyd, vinyl polymer I and vinyl polymer II.

The weight ratio of alkyd to vinyl polymer I and vinyl polymer II together is preferably in the range of from 5:95 to 90:10, more preferably in the range of from 10:90 to 60:40, and most preferably in the range of from 15:85 to 50:50.

The weight ratio of vinyl polymer I to vinyl polymer II is preferably in the range of from 30:70 to 99:1, more preferably in the range of from 60:40 to 98:2 and most preferably in the range of from 80:20 to 95:5.

The polymerisation of the olefinically unsaturated monomer(s) used to prepare vinyl polymer II may be carried out as described above for the preparation of vinyl polymer I. The preferred method is the batch-wise addition of redox initiator couple comprising for example an alkyl hydroperoxide in combination with a reductor such as iso-ascorbic acid at temperatures typically used for free radical emulsion polymerisation reactions. The aqueous free radical polymerisation of the olefinically unsaturated monomer(s) thus takes place in the presence of both the alkyd and vinyl polymer I.

After polymerisation, the free olefinically unsaturated monomer(s) content in the aqueous dispersion of the invention is preferably less than 500 ppm, more preferably less than 300 ppm, most preferably less than 100 ppm.

The aqueous dispersions according to the present invention typically have a solids content of from about 20 to 60% by weight, more preferably from 25 to 55% by weight.

The aqueous dispersions of the present invention are particularly useful as coating compositions or for providing the principle component of coating compositions (e.g. protective or decorative coating compositions) for which purpose they may be further diluted with water and/or organic solvents, or they may be supplied in more concentrated form by evaporation of water and/or organic components of the liquid medium. As coating compositions, they may be applied to a variety of substrates including, wood, board, metal, stone, concrete, glass, cloth, leather, paper, plastics, foam and the like, by a conventional method including brushing, dipping, flow coating, spraying, and the like. They are, however, particularly useful for providing coatings on wood and board substrates. The aqueous liquid medium is removed by natural or accelerated (by heat) drying to form a coating.

The coating compositions may contain other conventional ingredients including coalescing organic solvents, pigments, dyes, emulsifiers, surfactants, thickeners, heat stabilisers, levelling agents, anti-cratering agents, fillers, sedimentation inhibitors, UV absorbers, antioxidants and the like introduced at any stage of the preparation process or subsequently. It is possible to include an amount of antimony oxide in the dispersions to enhance the fire retardant properties.

In particular, the dispersions of the invention, and coating compositions containing them advantageously include a drier salt(s). Drier salts are well known to the art for further enhancing autoxidation in unsaturated fatty acid residue containing film-forming substances. Generally speaking, drier salts are metallic soaps, that is salts of metals and long chain carboxylic acids or metal naphthanates. It is thought that the metallic ions effect the curing action in the film coating and the fatty acid components confer compatibility in the coating medium. The most important drier metals are cobalt, manganese, zirconium, lead and calcium. The level of drier salt(s) in the composition is typically that to provide an amount of metal(s) within the range of from 0.01 to 0.5% by weight based on the weight of the alkyd.

Drier salts are conventionally supplied as solutions in common organic solvents for use in solvent-borne alkyd systems. They may, however, be used quite satisfactorily in aqueous-based coating compositions since they can normally be dispersed in such systems fairly easily. The drier salt(s) may be incorporated into the composition at any convenient stage. For example, it may be added to the alkyd, along with a neutralising agent, if used, prior to dispersion into water or to the preformed vinyl polymer I dispersion.

There is further provided according to a third embodiment of the present invention a coating obtainable from an aqueous dispersion according to the present invention.

If desired the aqueous dispersion of the invention can be used in combination with other dispersions or solutions that are not according to the invention.

The present invention is now illustrated by reference to the following example. Unless otherwise specified, all parts, percentages and ratios are on a weight basis. The prefix C before an example denotes that it is comparative.

Preparation of Vinyl Polymer I: A1

A 2-L 3-necked round bottom glass reactor, equipped with stirrer, thermometer and baffles, was loaded with the reactor phase components listed below in Table 1 under a nitrogen atmosphere. In a dropping funnel a pre-emulsion of monomer feed 1 and monomer feed 2 respectively was prepared by stirring a mixture of the monomer feed components listed in Table 1 below. The pH of both monomer feeds was adjusted to pH 8.5 with 25% ammonia. The reactor phase was heated whilst stirring to 90° C. At 90° C. a precharge consisting of 10% of the monomer feed 1 was added to the reactor followed by 30% of the initiator feed. The remainder was fed into the reactor over a period of 45 minutes at 90° C. After the end of monomer feed 1 the reactor was maintained at 90° C. for 30 minutes. Next, monomer feed 2 was added in 45 minutes at 90° C. The reaction mixture was cooled to 60° C. For the post-reaction t-BHPO was added in three equal shots during 45 minutes while the iso-ascorbic acid was fed during the same period. The batch was kept at 60° C. for another 15 minutes and cooled to ambient temperature, filtered and collected.

Vinyl polymer I: A2 and A3 were prepared using the method described above for vinyl polymer A1 and the components listed in Table 1 below except that for A2 the precharge was added at 35° C. and for A3 the amount of precharge was reduced to 5% of the monomer feed 1.

TABLE 1

| Components (g) | A1 | A2 | A3 |
|---|---|---|---|
| Reactor phase | | | |
| Demineralised Water | 419.93 | 658.50 | 419.93 |
| Amonium Persulphate | | 1.89 | |
| NaHCO$_3$ | | 2.08 | |
| Surfactant | 52.43 | 85.66 | 52.43 |
| Initiator feed | | | |
| Amonium Persulphate (3%) | 145.63 | 74.13 | 145.63 |
| Monomer feed 1 | | | |
| Demineralised Water | 202.93 | 258.26 | 202.93 |
| Surfactant | 17.48 | 21.42 | 17.48 |
| Styrene | 262.14 | — | 262.14 |
| Acrylonitrile | 43.69 | — | 305.83 |
| Butyl acrylate | 117.96 | 409.10 | 93.64 |
| Butyl methacrylate | — | — | 159.75 |
| Methacrylic acid | 13.11 | 32.95 | — |
| Acrylic acid | — | — | 52.43 |
| Methyl methacrylate | — | 332.21 | — |
| Acetoacetoxy ethyl methacrylate | — | 49.42 | — |
| Monomer feed 2 | | | |
| Demineralised Water | 202.30 | — | — |
| Surfactant | 17.48 | — | — |
| Styrene | 174.76 | — | — |
| Acrylonitrile | 87.38 | — | — |
| Butyl acrylate | 161.65 | — | — |
| Methacrylic acid | 13.11 | — | — |
| Post-reaction | | | |
| t-butylhydroperoxide (30%) | 5.83 | — | 5.83 |
| Iso-ascorbic acid (5%) | 17.48 | — | 17.48 |
| Proxel BD | 2.65 | — | 2.65 |

TABLE 1-continued

| Components (g) | A1 | A2 | A3 |
|---|---|---|---|
| Parmetal K-40 | — | 1.01 | — |
| Demineralised Water | 4.00 | 16.00 | 4.00 |
| Vinyl polymer properties | | | |
| Solids (weight %) | 43.30 | 42.50 | 39.40 |
| PH | 8.10 | 7.94 | 7.00 |
| Viscosity (mPa· s.) | 70 | 110 | 2700 |
| Sediment (weight %) | <0.05 | <0.05 | <0.05 |
| Particle size (nm) | 78 | 69 | 113 |

Surfactant = a phosphate ester of nonyl phenol ethoxylate available from Kao Chemicals
Proxel BD = a preservative available from Avecia Ltd
Parmetal K-40 = a preservative available from Rohm & Haas Preparation of Alkyds and Olefinically Unsaturated Monomers: U1

Stage 1 Preparation of an Alkyd Polyol from Soybean Oil

A reactor was charged with N,N-diethanolamine (148.8 g) and sodium methoxide (1.2 g). The mixture was heated to 90 to 100° C. until all of the sodium methoxide had dissolved. Subsequently, soybean oil (750 g) was added to the mixture followed by stirring and heating to 105 to 110° C. for 4.5 hours in a nitrogen atmosphere.

The theoretical hydroxy equivalent weight of the alkyd polyol was 265.

Stage 2 Preparation of an Uralkyd

The alkyd polyol from Stage 1 (275.4 g 61.5 wt. %) was mixed in a reactor with methoxycarbowax 750 methoxypolyethylene glycol, (MPEG750, Mn=750, 20.7 g.) 2,2-dimethylolpropionic acid (DMPA, 21.3 g.), cyclohexanedimethanol (CHDM, 9.9 g) and N-methylpyrrolidone (41.9 g). Toluene diisocyanate (TDI) (120.7 g) was added over a period of 1 hour to this polyol mixture during which the temperature was maintained at 50 to 60° C. After complete addition of the TDI, the olefinically unsaturated monomer used to prepare vinyl polymer II (methyl methacrylate (MMA), 59.8 g, 7.5% by weight based on uralkyd total polymer weight) was added and the temperature increased to 70 to 80° C. for two hours. Then, dipropylene glycol monomethyl ether (56.5 g), N,N-dimethylethanolamine (14.1 g), manganese drier salt solution (9.3 g) and water (170.9, 60° C.) were subsequently added to the mixture while stirring to form a predispersion. The resulting predispersion had a clear, transparent yellow colour with a viscosity of 3,400 mPa.s and solids content of 63.4%. Uralkyds U2, U4 and U6 were prepared using the method described above for U1 and the components (given as wt. % based on the total weight of the components) listed below in Table 2.

TABLE 2

| Components wt % | U2 | U4 | U6 |
|---|---|---|---|
| Alkyd polyol (U1 stage 1) | 52.3 | 64.0 | 61.5 |
| Isocyanate | HDI/TDI* | HDI | IPDI |
| DMPA | 6 | 4 | 6 |
| CHDM | 4 | 0 | 4 |
| NCO/OH ratio | 0.88 | 0.85 | 0.82 |
| MPEG 750 | 7 | 5 | 0 |
| Monomers | MMA | BMA | S/MMA |
| Monomer | 30 | 24 | 8/8 |
| Solids wt % | 84.2 | 82.4 | 63.4 |

HDI/TDI* = 1:1 molar ratio

Preparation of Fatty Acid Polyester Amide U3

A 2 litre, five-necked reactor flask fitted with a stirrer, a thermometer and a condenser fitted with a Dean-Stark condensate trap, was loaded with adipic acid (434.12 g), dimethylol propanoic acid (99.36 g), methoxypolyethylene glycol (Mn 750; 115.92 g), 1,4-cyclohexane dimethanol (66.24 g) and alkyd amide polyol (prepared as described in U1, stage 1; 866.52 g) in a nitrogen atmosphere. The resulting slurry was slowly heated to 180° C., over a period of one hour, under vigorous stirring and the reaction water was distilled off. At 180° C., the mixture becomes clear. After three hours of reaction time at this temperature, a portion of Fastcat 2005 (stannous(II)chloride, Trademark from AtoFina; 1.0 g) was added to the reaction mixture. After a total of 6 hours reaction time at 180° C., the acid value had dropped to 55.4 mg KOH/g and the resulting viscous mixture was cooled to 50° C. diluted with ethyl methacrylate (115.4 g) and stored under nitrogen.

U7=Rhenalyd WL-922

Rhenalyd WL-922 is a commercially available alkyd supplied by Neste Chemical Gmbh, which was diluted with methyl methacrylate (10 wt. % based on the weight of Rhenalyd (95 wt. % solids) and weight of methyl methacrylate).

Preparation of Aqueous Uralkyd/Vinyl Polymer I and II Dispersions

EXAMPLE 1

In a nitrogen atmosphere, U1 as prepared above (50 g, solids 63.4%) was dispersed in vinyl polymer I (NeoCryl A633, an acrylic styrene anionic polymer emulsion (450 g, 42.5% solids), available from NeoResins, Avecia BV), at 60° C. over a period of 15 minutes. The mixture was subsequently stirred for an additional 30 minutes until a homogeneous dispersion was obtained. (NeoCryl and Neo-Resins are Trademarks of Avecia BV)

T-butyl hydroperoxide (1.42 g, 30% aqueous slurry) and iso-ascorbic acid (9.50 g, 5% aqueous solution, pH adjusted to 8.5 with 25% ammonia) were added separately, each in three equal batches, to the homogeneous dispersion. After the addition of each batch, the temperature was raised to 75° C. for 15 minutes before cooling to 65° C. and adding the next batch. The resulting dispersion was cooled to ambient temperature and filtered.

The solids content of the dispersion was 44.0 wt. %, the free olefinic monomer content was less than 25 ppm (0.0025%) and the particle size was 106 nm. Examples 2 to 7 were prepared in a similar manner using the components listed below in Table 3.

TABLE 3

| Example | 2 | 3 | 4 | 5 | 6 | 7 | 8 |
|---------|---|---|---|---|---|---|---|
| Alkyd | U1 | U2 | U3 | U2 | Rhenalyd | U4 | U6 |
| Amount (g) (solids) | 50 | 45 | 40 | 13.8 | 10 | 15.79 | 7.04 |
| Vinyl polymer I | A2 | A3 | A1 | A2 | A2 | A1 | A2 |
| Amount (g) (solids) | 42.0 | 60.0 | 130.0 | 43.5 | 80.0 | 84.2 | 93.0 |
| Properties | | | | | | | |
| PH | 8.1 | 7.1 | 7.7 | 6.8 | 7.4 | 7.0 | 7.5 |
| Solids (%) | 51.8 | 33.4 | 46.8 | 46.0 | 44.6 | 45.6 | 43.5 |
| Viscosity (mPa · s.) | 220 | 180 | 380 | 390 | 13 | 115 | 12 |
| Free monomer (ppm) | 85 | 10 | 55 | <25 | 85 | <25 | 10 |

COMPARATIVE EXAMPLE 1

Preparation of an Aqueous Uralkyd and an in-situ Prepared Vinyl Polymer Dispersion Blended with a Vinyl Polymer Dispersion In a nitrogen atmosphere U1 as prepared above (500 g, solids 63.4%) was dispersed in water (744 g) over a period of 15 minutes at 45 to 50° C. Then t-butyl hydroperoxide (22.2 g, 3.5% aqueous slurry) and iso-ascorbic acid (36.4 g, 2% aqueous solution, pH adjusted to 8.5 with 25% ammonia) were added and the mixture heated to 60° C. for one hour. Then more U1 (250 g) was dispersed into the mixture. T-butyl hydroperoxide (11.9 g, 3.5% aqueous slurry) and iso-ascorbic acid (17.6 g, 2% aqueous solution, pH adjusted to 8.5 with 25% ammonia) were added and the mixture heated to 60° C. for one hour. The resulting clear uralkyd/vinyl polymer dispersion has a solids content of 30.2 wt. %. The free monomer level was >300 ppm.

Under a nitrogen atmosphere, the resulting polymer dispersion (50 g, solids 30.2%) and NeoCryl A633 were mixed at room temperature for about 30 minutes until a homogeneous dispersion was obtained. The product was filtered and collected and the solids content was found to be 40.8 wt. %.

Hardness Development

All examples shown in Table 5 below were formulated with 1–2% Dapro 5005, (a drier salt available from Profiltra) and the Konig hardness (KH) was measured on a Erichsen hardness measuring instrument using DIN 53157 NEN 5319.

TABLE 5

| Example | Alkyd | Vinyl polymer I | KH Day 1 | KH Day 7 | KH Day 14 | KH Day 21 | KH Day 28 | % increase in KH after 28 days |
|---------|-------|-----------------|----------|----------|-----------|-----------|-----------|-------------------------------|
| C2 | — | A1 | 85 | 84 | 83 | 83 | 88 | 3.4 |
| C3 | — | A2 | 52 | 52 | 52 | 64 | 68 | 23 |
| C4 | — | A3 | 181 | 183 | 197 | 183 | 205 | 11.7 |
| 2 | U1 | A2 | 14 | 97 | 110 | 121 | 123 | 88.6 |
| 3 | U2 | A3 | 48 | 68 | 81 | 116 | 146 | 67.1 |
| 4 | U3 | A1 | 39 | 56 | — | 66 | 64 | 39.0 |
| 5 | U2 | A2 | 24 | 29 | 35 | — | — | 45.8 |
| 6 | U7 | A2 | 10 | 21 | — | 29 | 46 | 54.3 |
| 7 | U4 | A1 | 59 | 69 | 68 | 67 | 69 | 14.4 |
| 8 | U6 | A2 | 38 | 47 | 53 | 53 | 57 | 33.3 |

Coalescent Demand

Coalescent demand for the examples shown in Table 6 below was determined by gradually increasing the amount of butylglycol added to 100 g of the dispersion until film formation was good.

TABLE 6

| Example | Alkyd | Vinyl polymer I | Coalescent demand (g) |
|---|---|---|---|
| C3 | — | A2 | 15 |
| C4 | — | A3 | 16 |
| 2 | U1 | A2 | 0 |
| 3 | U2 | A3 | 0 |
| 6 | U7 | A2 | 0 |
| 8 | U6 | A2 | 0 |

MFFT

The MFFT's of the examples shown in Table 7 below were determined using a MFFT-bar 90 instrument.

TABLE 7

| Example | alkyd | Vinyl polymer I | MFFT (° C.) |
|---|---|---|---|
| C2 | — | A1 | 50 |
| 4 | U3 | A1 | 3.0 |
| 7 | U4 | A1 | <0 |
| C3 | — | A2 | 23 |
| 2 | U1 | A2 | <0 |
| 6 | U7 | A2 | 8.0 |
| 8 | U6 | A2 | 8.0 |
| C4 | — | A3 | 64 |
| 3 | U2 | A3 | <0 |

COMPARATIVE EXAMPLE 5

MMA (50.0 g) was polymerised using a standard emulsion polymerisation recipe to give a vinyl polymer B. Vinyl polymer A1 and B were blended together under normal agitation. To this dispersion alkyd U2* (450.0 g) was added. (U2*=U2 prepared without the addition of MMA). Due to the very high viscosity of the alkyd as a result of absence of the reactive diluent (MMA) the alkyd U2* was not dispersible in the vinyl polymer dispersion. The addition of up to 15% (on alkyd solids) anionic surfactants or increasing the agitation speed also did not result in dispersion of the alkyd, and no homogeneous alkyd-vinyl polymer dispersion could be obtained under the condition used to prepare the dispersions of examples 1–8.

COMPARATIVE EXAMPLES 1 AND 6 TO 10

The solids content of the examples was compared to the solids content of blends prepared with vinyl polymers A1, A2 and A3 and alkyds U1*, U2*, U3*, U4* and U6* and are shown in Table 8 below. (U1*, U2*, U3*, U4* and U6* were prepared in the same manner as equivalent uralkyds U1, U2, U3, U4 and U6 but without the addition of any olefinically unsaturated monomers). Without the presence of the olefinically unsaturated monomers the viscosity of U1*, U2*, U3*, U4* and U6* was too high to be able to disperse them in vinyl polymer I, so they were all diluted with demineralised water to a solids content of 27.5 wt %.

TABLE 8

| Example | Vinyl Polymer I | Vinyl Polymer I (g) | Alkyd | Alkyd (g) | Solids Weight % |
|---|---|---|---|---|---|
| 1 | NeoCryl A663 | 450.0 | U1 | 78.9 | 44.6 |
| 2 | A2 | 98.8 | U1 | 78.9 | 51.8 |
| 4 | A1 | 300.2 | U3 | 40.0 | 50.0 |
| 5 | A2 | 101.8 | U2 | 16.6 | 48.1 |
| 7 | A1 | 194.0 | U4 | 19.0 | 46.9 |
| 8 | A2 | 218.8 | U6 | 11.0 | 43.5 |
| C1 | NeoCryl A663 | 450.0 | U1* | 181.8 | 41.0 |
| C6 | A2 | 98.8 | U1* | 181.8 | 33.1 |
| C7 | A1 | 300.2 | U3* | 145.5 | 37.6 |
| C8 | A2 | 101.8 | U2* | 50.9 | 34.3 |
| C9 | A1 | 194.0 | U4* | 58.2 | 39.0 |
| C10 | A2 | 218.8 | U6* | 25.5 | 40.9 |

What is claimed is:

1. An aqueous dispersion comprising:

(i) alkyd;
(ii) vinyl polymer I;
(iii) vinyl polymer II; and
(iv) liquid medium;

wherein said vinyl polymer I and alkyd are each separately pre-formed prior to incorporation into the aqueous dispersion and wherein said vinyl polymer II is prepared in the presence of the alkyd and the vinyl polymer I.

2. A dispersion according to claim 1 wherein the alkyd is a uralkyd.

3. A dispersion according to claim 1 or 2 wherein the alkyd has isocyanate-reactive groups.

4. A dispersion according to claim 1 or 2 wherein the vinyl polymer I comprises 1 to 20% by weight of acetoacetoxy ethyl methacrylate.

5. A dispersion according to claim 1 or 2 wherein the vinyl polymer I comprises 10 to 40% by weight of acrylonitrile; 30 to 60% by weight of styrene; 2 to 8% by weight of acid functional olefinically unsaturated monomer(s); and 0 to 50% by weight of other olefinically unsaturated monomer (s); wherein the sum of the percentages add up to 100%.

6. A dispersion according to claim 1 or 2 wherein the vinyl polymer II comprises one or more monomers selected from methyl (meth)acrylate, ethyl (meth)acrylate, butyl (meth) acrylate and styrene.

7. A dispersion according to claim 1 or 2 wherein vinyl polymer II comprises from 1 to 50% w/w based on the weight of alkyd, vinyl polymer I and vinyl polymer II.

8. A dispersion according to claim 1 or 2 wherein the weight ratio of vinyl polymer I to vinyl polymer II is in the range of from 30:70 to 99:1.

9. A dispersion according to claim 1 or 2 wherein the weight ratio of vinyl polymer I to vinyl polymer II is in the range of from 70:30 to 97:3.

10. A dispersion according to claim 1 or 2 wherein the weight ratio of alkyd to vinyl polymer I and vinyl polymer II together in the range of from 1:95 to 90:10.

11. A dispersion according to claim 1 or 2 wherein the liquid medium comprises 50 to 100% by weight of water.

12. A process for preparing an aqueous dispersion according to claim 1 or 2 comprising combining:
   (a) alkyd;
   (b) olefinically unsaturated monomer(s);
   (c) vinyl polymer I; and
   (d) liquid medium at a temperature in the range of from 0 to 85° C., followed by polymerisation of the olefinically unsaturated monomer(s) to give vinyl polymer II.

13. A process according to claim 12 wherein the alkyd containing olefinically unsaturated monomer(s) is dispersed into a dispersion of vinyl polymer I.

14. A coating obtainable from an aqueous dispersion according to claim 1 or 2.

15. In a method of coating with a coating composition, the improvement wherein said coating composition comprises an aqueous dispersion according to claim 1 or 2.

16. A process according to claim 12 wherein the olefinically unsaturated monomer reduces viscosity of the alkyd and diffuses into the pre-formed vinyl polymer I particles for free-radical polymerization therein thereby avoiding impairment of auto-oxidation properties of the alkyd.

17. The aqueous dispersion obtained by the process of claim 16.

* * * * *